Oct. 16, 1934.   E. J. GENGLER   1,976,721
STOCK ENCLOSURE AND SYSTEM OF ELECTRICALLY CHARGING THE SAME
Filed Nov. 23, 1932
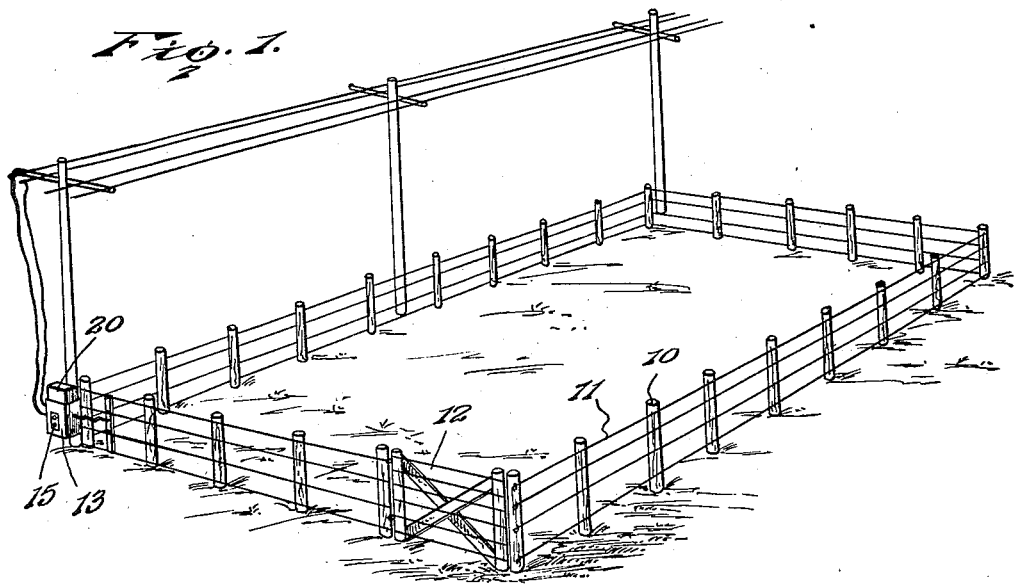
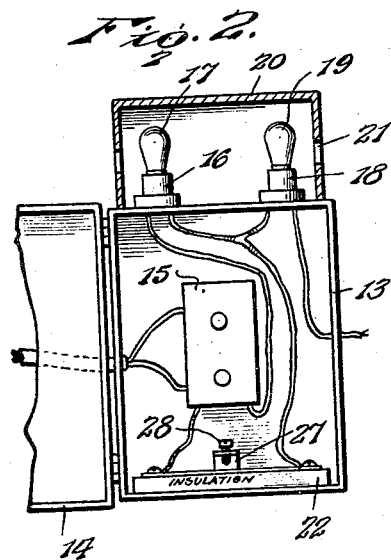
Inventor
E. J. Gengler.
By Lacey & Lacey, Attorneys Patented Oct. 16, 1934

1,976,721

UNITED STATES PATENT OFFICE 1,976,721

STOCK ENCLOSURE AND SYSTEM OF ELECTRICALLY CHARGING THE SAME

Edwin J. Gengler, Milwaukee, Wis.

Application November 23, 1932, Serial No. 644,125

REISSUED

7 Claims. (Cl. 175—265)

This invention relates to an improved protective stock enclosure and system of electrically charging the same.

The invention seeks, among other objects, to provide an enclosure wherein one or more of the fence wires thereof will be electrically charged so that an animal coming in contact with the fence will receive an electric shock and will thus be deterred from breaking through the fence to escape.

The invention seeks, as a further object, to provide an enclosure wherein the fence wires thereof will be electrically charged intermittently so that should an animal come in contact with the fence at the time it is charged and is shocked to such a degree as to prevent a voluntary release from the fence, subsequent de-energization of the fence wires will permit the animal to move away from the fence without effort so that injury which might otherwise ensue to the animal will be avoided.

And the invention seeks, as a still further object, to provide an enclosure wherein the time interval of energization of the fence may be readily regulated and also wherein the voltage on the fence wires may be readily regulated.

Other and incidental objects, not particularly mentioned in the foregoing, will be apparent during the course of the following description.

In the accompanying drawing forming part of this specification,

Figure 1 is a perspective view of a stock enclosure embodying my invention,

Fig. 2 is a front elevation showing the box preferably employed to house the switch and circuit closer used, Fig. 3 is a plan view of the circuit closer, Fig. 4 is an edge elevation of the circuit closer, Fig. 5 is an end elevation of the circuit closer particularly showing the contact screw employed, and Fig. 6 is a diagrammatic view showing the circuits.

Referring now more particularly to the drawing, I have shown a stock enclosure which is intended to typify any suitable enclosure for live stock or other animals. In the present instance, I have shown fence posts 10 which carry a number of fence wires, one of which is indicated at 11. Any approved number of fence wires may, of course, be used or, in lieu thereof, a woven wire fence may be substituted. A gate for the enclosure is shown at 12.

I preferably provide a suitable metal box 13 having a door 14. This box may be mounted adjacent the enclosure, as shown in Fig. 1 of the drawing, or at any other convenient or approved location, and mounted within the box is a suitable switch 15. The specific construction of this switch is unimportant. Mounted upon the top wall of the box is a lamp socket 16 which removably receives a flasher lamp 17 and arranged adjacent the socket 16 is a like socket 18 which removably receives a combined load and flasher lamp 19. If desired, a hood 20 may be provided for the lamps 17 and 19. As shown, the hood simply rests on the top wall of the box 13 so that the hood may be readily removed when necessary, and formed in the hood are sight openings 21 so that the flashing of the lamps 17 and 19 may be readily observed.

Mounted upon the bottom wall of the box is a circuit closer. In this instance, I have shown the use of a thermostatic circuit closer but it is to be understood that any approved circuit closer of other type may be substituted therefor. The circuit closer shown includes, as will be observed, an oblong base 22 which is of suitable insulating material and extending longitudinally of the base is an appropriate metallic thermostatic strip 23 anchored at its ends by fastening devices 24. Extending parallel to the strip 23 is a non-thermostatic conductor strip 25 secured at its ends to the base by fastening devices 26. Fixed to the strip 25, medially thereof, is a plate 27 offset to overhang the strip 23 and screwed through said plate, near its free end, is a contact screw 28. When current is passed through the strip 23 and, due to its resistance, said strip is caused to heat, the strip will, as shown in dotted lines in Fig. 4, expand and bow upwardly to engage the screw 28 for closing a circuit therethrough.

Leading from one side of a suitable supply circuit, as particularly shown in Fig. 6, is a wire 29 connected to one end of the strip 23 of the circuit closer and leading from the opposite end of said strip to return to the other side of the supply circuit is a wire 30 interrupted by the switch 15. Thus, the wires 29 and 30 provide a primary circuit for heating the thermostatic element 23, flow of current in said circuit being controlled by the switch 15. Connected to one end of the conductor strip 25 of the circuit closer is a wire 31 leading to one side of the lamp 17 and leading from the other side of said lamp is a wire 32 connected with the wire 30 of the primary circuit. The wires 31 and 32 thus provide a flasher circuit shunting the lamp 17 across the primary circuit. Connected with the wire 31 of the flasher circuit is a wire 33 leading to one side of the lamp 19 and leading from the opposite side of said lamp to the fence wire 11 is a wire 34. The wires 33, 34 and 11 thus provide an open shock circuit connecting the lamp 19 in series with one side of the flasher circuit. Accordingly, the lamp 19 will control the voltage in the shock circuit and by choosing a lamp of a desired wattage the voltage of said circuit may be easily predetermined.

Assuming now that the switch 15 is closed, it will be seen that current will flow through the wires 29 and 30 for heating the element 23, as previously described, when this element will flex upwardly to engage the screw 28. Current will then flow through the screw, the plate 27, strip 25 and wires 31 and 32 for energizing the lamp 17 with the result that the lamp will be caused to flash for giving a visible signal of the operation of the circuit closer. In this connection, it should be noted that the resistance of the flasher circuit, including the lamp 17, is less than the resistance offered by half the length of the strip 23 so that upon engagement of said strip with the contact screw 28, current will, as stated, flow in the flasher circuit. Upon the engagement of the strip with the contact screw 28, however, the reduction in the flow of current therethrough, for the reason just stated, will result in immediate cooling of the strip and its consequent contraction out of engagement with the screw 28. Accordingly, the flasher circuit will be broken to extinguish the lamp 17 with resultant re-heating of the strip 23 to again engage the contact screw and this cycle will be repeated indefinitely as long as the switch 15 remains closed.

When the flasher circuit is closed, the open shock circuit formed by the wires 33, 34 and 11, and including the lamp 19, will be energized so that should an animal within the enclosure at that time come in contact with the wire 11, the circuit will be closed through the animal to the ground with resultant electrical shock to the animal. When the contact strip 23 subsequently moves away from the contact screw 28, however, the shock circuit will, as will be perceived, be de-energized so that the animal will be permitted to freely move away from the enclosure fence. Injury which might otherwise result to the animal will thus be avoided. Furthermore, as will be seen, by adjusting the screw 28 of the circuit closer downwardly to decrease the movement of the strip when heated, the length of time the shock circuit is de-energized may be prolonged. Also, it is to be noted that when the shock circuit is closed by an animal coming in contact with the wire 11, the lamp 19 will be energized to thus visually indicate that the animal is, at some point in the enclosure, in contact with the fence. Accordingly, should the lamp 19 continue to flash each time the lamp 17 flashes, such condition will indicate to the owner or the caretaker that the animal is entangled in the fence so that immediate aid may be given.

Having thus described the invention, I claim:

1. An enclosure of the character described including a conductor disposed for engagement by an animal within the enclosure, a primary circuit, a circuit closer in the primary circuit for periodically closing said circuit, an open shock circuit including said conductor energized when the primary circuit is closed, and means for signalling the periodic closing of the primary circuit, the period of closing of the primary circuit being of sufficient duration to permit an animal coming in contact with the shock circuit to be freed therefrom.

2. An enclosure of the character described including a conductor disposed for engagement by an animal within the enclosure, a primary circuit, a circuit closer in the primary circuit for periodically closing said circuit, an open shock circuit including said conductor energized when the primary circuit is closed, a flasher circuit shunted across the primary circuit, and a flasher lamp in the flasher circuit, the period of closing of the primary circuit being of sufficient duration to permit an animal coming in contact with the shock circuit to be freed therefrom.

3. An enclosure of the character described including a conductor disposed for engagement by an animal within the enclosure, a primary circuit, a circuit closer in the primary circuit for periodically closing said circuit, an open shock circuit including said conductor energized when the primary circuit is closed, and means for signalling the closing of the shock circuit, the period of closing of the primary circuit being of sufficient duration to permit an animal coming in contact with the shock circuit to be freed therefrom.

4. An enclosure of the character described including a conductor disposed for engagement by an animal within the enclosure, a primary circuit, a circuit closer in the primary circuit for periodically closing said circuit, an open shock circuit including said conductor energized when the primary circuit is closed, and means for signalling the closing of the shock circuit and predetermining the voltage in said circuit, the period of closing of the primary circuit being of sufficient duration to permit an animal coming in contact with the shock circuit to be freed therefrom.

5. An enclosure of the character described including a conductor disposed for engagement by an animal within the enclosure, a primary circuit, a circuit closer in the primary circuit for periodically closing said circuit, a flasher circuit shunted across the primary circuit, a lamp in the flasher circuit for signalling the periodic closing of the primary circuit, an open shock circuit connected to one side of the flasher circuit, and a lamp in the shock circuit for signalling the closing of the shock circuit, the period of closing of the primary circuit being of sufficient duration to permit an animal coming in contact with the shock circuit to be freed therefrom.

6. An enclosure of the character described including a conductor disposed for engagement by an animal within the enclosure, a primary circuit, a circuit closer in the primary circuit for periodically closing said circuit, and an open shock circuit including said conductor energized when the primary circuit is closed, the period of closing of the primary circuit being of sufficient duration to permit an animal coming in contact with the shock circuit to be freed therefrom.

7. An enclosure of the character described including a conductor disposed for engagement by an animal within the enclosure, a primary circuit, a circuit closer in the primary circuit for periodically closing said circuit, an open shock circuit including said conductor energized when the primary circuit is closed, and means for varying the interval of the periodic closing of the primary circuit, the period of closing of the primary circuit being of sufficient duration to permit an animal coming in contact with the shock circuit to be freed therefrom.

EDWIN J. GENGLER. [L. S.]